United States Patent Office 3,190,618
Patented June 22, 1965

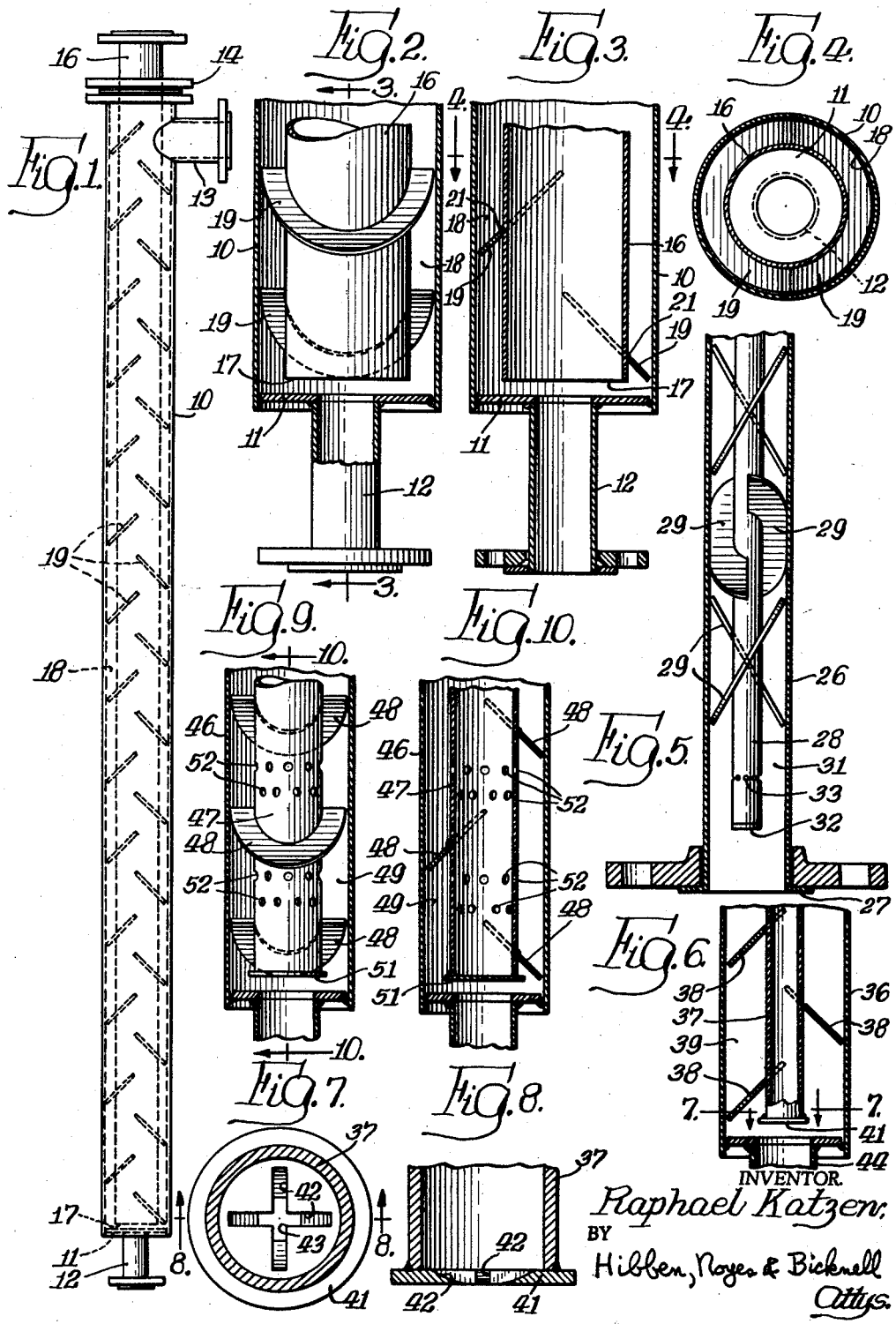

3,190,618
FLUID MIXER
Raphael Katzen, 3735 Dogwood Lane, Cincinnati, Ohio
Filed Apr. 30, 1963, Ser. No. 276,922
10 Claims. (Cl. 259—4)

This invention relates to improvements in fluid mixers and more particularly to a novel fluid mixer for use in mixing a plurality of fluids, at least one of which is a medium or high viscosity liquid.

In the art of mixing fluids, many mechanical agitating devices have been proposed and utilized. However, when applied to the mixing of viscous liquids, either with other viscous liquids or with low viscosity liquids or gases, conventional mechanical agitation becomes quite inefficient because of the great amount of shear energy required to disperse the viscous liquid or to expose a large surface area of the viscous liquid to the other fluid with which it is being mixed, particularly a less viscous fluid. For example, in the mixing of molasses with water, as required in alcohol and other fermentation industries utilizing molasses as a raw material, the energy required to move the large volume of viscous molasses and to shear it so as to expose the surface for mixing is many times the energy utilized in the actual mixing of the low viscosity water with the highly viscous molasses. Not only is a large amount of energy wasted, but also the mixing equipment, particularly the agitator arms or blades, shaft, and bearings, must be of very heavy construction and, therefore, becomes quite expensive. Another objectionable feature of conventional mechanical agitation in such a system is the excessive splashing which frequently occurs due to the erratic mixing action, thereby resulting in both unsightly and unsanitary conditions. Moreover, where aseptic conditions must be maintained, as in mashes being prepared for fermentation, frequent drainage, cleaning, and sterilization of the mixing facilities are required in order to reduce the danger of contamination, Another example of a difficult mixing problem which is not satisfactorily solved by conventional mixing techniques is the oxidation of pulp mill black liquor with air or oxygen. It is customary for this purpose to employ large tanks for the black liquor with spargers to disperse the gas, baffles in the tank to improve the mixing, and a deep bath of the viscous black liquor to provide sufficient contact time to insure adequate absorption of oxygen in the liquor. The net result is that a very substantial amount of energy is required to compress the gas sufficiently so that it can be dispersed through the spargers and passed through the deep bath of liquor. Here, again, only a small amount of the energy put into the system is actually utilized in mixing the gas with the liquor, the remainder of the energy being consumed in dividing the gas into discrete bubbles and forcing the same through the body of liquor.

Accordingly, a primary object of the present invention is to provide a novel and improved fluid mixer which overcomes the foregoing objections to conventional mixers by utilizing the kinetic energy of the fluids being mixed without requiring any external source of mechanical energy for operation of the mixer.

A further object of the invention is to provide a novel and improved fluid mixer which requires only a relatively small energy input by means of pumps or compressors acting on the fluids being mixed.

An additional object of the invention is to provide a novel and improved fluid mixer which does not involve any moving parts, stuffing boxes or seals, bearings, or drive mechanisms.

Another object of the invention is to provide a novel and improved fluid mixer characterized by a simplified construction, reduced cost of operation and maintenance, and more thorough and uniform mixing with minimum expenditure of energy.

Still another object of the invention is to provide a novel and improved fluid mixer which is especially adapted for mixing a medium or high viscosity liquid with another fluid, including either a liquid or a gas.

Other objects and advantages of the invention will become apparent from the subsequent detailed description taken in conjunction with the accompanying drawings, wherein:

FIG. 1 is an elevational view of a mixer comprising one specific embodiment of the invention;

FIG. 2 is an enlarged view of the lower end portion of the apparatus shown in FIG. 1 with portions of the structure being broken away to reveal the internal construction;

FIG. 3 is a vertical sectional view taken along the line 3—3 of FIG. 2;

FIG. 4 is a horizontal sectional view taken along the line 4—4 of FIG. 3;

FIG. 5 is an internal view of the lower end portion of a mixer comprising a different embodiment of the invention;

FIG. 6 is a view generally similar to FIG. 3 but showing a modification of the structure;

FIG. 7 is an enlarged horizontal sectional view taken along the line 7—7 of FIG. 6;

FIG. 8 is a vertical sectional view taken along the line 8—8 of FIG. 7;

FIG. 9 is a view generally similar to FIG. 2 but showing another modification of the invention; and FIG. 10 is a vertical sectional view taken along the line 10—10 of FIG. 9.

FIGS. 1-4 illustrate a preferred embodiment of the invention for use in mixing two liquids, at least one of which has a relatively high viscosity, such as in the mixing of molasses with water. The mixer consists essentially of an upright, elongated, double-pipe arrangement having an outer tubular conduit or pipe 10 with a bottom wall 11 and a smaller diameter inlet nozzle 12 connected thereto. A fluid mixture outlet 13 extends radially from the pipe 10 adjacent the upper end thereof. The upper end of the pipe 10 is provided with a double flange 14 with a gasket seal therebetween. An elongated inner tubular conduit or pipe 16 extends through the gasket sealed end 14 of the outer pipe 10 in concentric relation with the latter and terminates in an open end portion 17 which is spaced slightly above the bottom end wall 11 of the outer pipe 10.

The annular space, designated at 18, between the pipes 10 and 16 comprises the mixing space of the apparatus, as hereinafter described, and is provided with a plurality of baffles 19. Each baffle 19 is in the form of a semi-ellipse disposed in a plane which is inclined with respect to the longitudinal axis of the concentric pipes 10 and 16. The semi-elliptical baffles 19 extend across the annular space 18 between the pipes 10 and 16 so that each baffle effectively blocks a circumferential half of the annular space 18. For convenience of construction, it is preferred that the semi-elliptical baffles 19 be rigidly secured at their innermost edges, as by welding 21, to the inner pipe 16. Thus, by removing the outer flange of the double flange head 14, the inner pipe 16 with the baffles 19 attached thereto can be withdrawn as a unit from the outer pipe 10, thereby facilitating cleaning, replacement, and repair. In order to prevent by-passing of fluid flow, the outermost edges of the semi-elliptical baffles 19 should have a very close clearance fit with the inner wall of the pipe 10. For example, a spacing of not more than a few hundredths of an inch will substantially prevent fluid flow between the baffles 19 and the pipe 10 or will at least reduce such flow to an insignificant level.

As best seen in FIG. 1, the baffles 19 are arranged in spaced relation along the length of the annular mixing space 18, and alternate baffles 19 are disposed with generally opposite inclinations and at diametrically opposed portions of the annular space 18. As described below, fluid flow through the annular space 18 is from the lower end of the apparatus, adjacent the inlet 12 and inner pipe outlet 17, upwardly to the discharge outlet 13. As will be evident from the drawing, the baffles 19 are sloped or inclined in the general direction of fluid flow through the space 18 but are arranged so that the fluid repeatedly impinges upon and is diverted by the successive baffles during flow toward the discharge outlet 13.

In the operation of the mixer shown in FIGS. 1–4, the relatively viscous liquid, such as molasses, is introduced through the upper end of the pipe 16, and the less viscous fluid, such as water, is introduced in a countercurrent direction through the inlet 12 at the lower end of the apparatus. The outlet 17 at the lower end of the pipe 16 is spaced a relatively slight distance from the end wall 11 so as to impart a high velocity to the relatively viscous liquid being discharged from the pipe 16 into the mixing space 18. This high velocity in combination with the reversal in direction of flow results in turbulence which accomplishes an initial dispersion in the high viscosity liquid of the low viscosity fluid entering through the inlet 12. This fluid dispersion then passes upwardly through the annular space 18 containing the baffles 19.

The dimensions of the annular space 18 and the axial spacing between the baffles 19 are selected to insure a relatively high velocity of flow so as to cause additional mixing of the dispersed fluids. However, the principal mixing action is obtained by impingement of the fluids against the inclined baffles 19 which cause a major diversion and change of direction of the fluid flow, thereby creating an effective shear action in the particles or body of the more viscous liquid. This shear action results in the development of additional new surface in the viscous liquid which is then available for absorption of the low viscosity fluid. This repeated impingement and diversion of the fluids during passage through the tortuous flow path results in uniform and complete mixing.

A key factor in the effective operation of the mixer is the proper design and placement of the baffles 19 in the annular mixing space 18. Each baffle must block approximately one-half of the annular cross-sectional area and be so inclined as to divert substantially all of the fluid flow against the next succeeding baffle. Thus, it is necessary that the baffles be substantially semi-elliptical and that successive baffles in the line of flow be arranged with generally opposite inclinations. It is also necessary that successive baffles in the line of flow have different circumferential orientations within the annular space 18 so that there is no opportunity for undesirable by-passing of any of the baffle elements during flow through the mixer. Thus, the present baffle arrangement has substantial advantages over other possible baffle arrangements which tend to permit by-passing and can allow two or more parallel flow paths leading to ineffective mixing action. Although the angle of inclination of the baffles with respect to the longitudinal axis of the concentric tubes is not especially critical, best results are obtained within an angular range of from about 30° to about 60°. In particular, an angular inclination of about 45°, as shown in FIGS. 1–4, is useful in mixing two different liquids.

Conventional pressure drop calculations applied to the geometry of the annular space 18 and its baffles 19 permit the determination of the energy loss during flow, which in the present invention is equal essentially to the theoretical energy of mixing. The length of the mixer is determined by the space required between successive baffles 19 for obtaining turbulent flow without excessive energy loss and also by the number of baffles required to insure proper mixing. The relative diameters of the inner and outer tubes 16 and 10 may vary over a wide range, depending upon the relative proportions of the two fluid streams being mixed, the fluid velocities required for turbulent flow and the baffle spacing.

A particularly advantageous use of the mixer of the present invention is found in the mixing of slurries with other fluids of high, medium or low viscosity. The impingement and diversion action of the baffles serves to disperse the slurried solid particles uniformly throughout the mass of fluid, thereby insuring uniform and substantially homogeneous contact, for example, as required in neutralizing molasses solutions with hydrated lime slurries.

In FIG. 5, another embodiment of the invention is shown which is especially useful for mixing low viscosity fluids, such as gases, with highly viscous liquids or when only a small quantity of a low viscosity liquid is to be mixed with a large quantity of a highly viscous liquid. Only the lower end portion of the mixer is shown in FIG. 5, the upper portion having essentially the same construction as shown in FIG. 1. The mixer has an outer tube 26 with a flanged open lower end 27 through which the high viscosity liquid is introduced. A concentric inner tube 28 is provided within the tube 26 and has secured thereto a plurality of semi-elliptical inclined baffles 29 having a close clearance fit with the outer tube 26 for effectively blocking fluid flow through the annular mixing space 31 between the tubes. The lower end of the tube 28 is plugged, as at 32, and a plurality of radial apertures 33 are disposed in a ring around the lower end of the pipe 28 for admitting the low viscosity fluid into the mixing space 31.

In this instance the arrangement and orientation of the baffles 29 differs somewhat from the arrangement of baffles 19 shown in FIGS. 1–4. In the previously described embodiment of the invention, each semi-elliptical baffle 19 was obtained by dividing an elliptical configuration across the shorter or minor axis of the ellipse. However, in FIG. 5 the semi-elliptical baffles 29 are more elongated in character and are obtained by dividing the corresponding elliptical configuration along the longer or major axis of the ellipse. In addition, in FIG. 5 each baffle is inclined at an angle of approximately 30° with respect to the longitudinal axis of the concentric tubes 26 and 28.

A further difference in the FIG. 5 embodiment is found in the particular spacing and orientation of the baffles 29. In this instance, the baffles 29 are arranged in opposed pairs in which the respective baffle elements of each pair are disposed at opposite sides of the inner tube 28 so as to effectively block opposed circumferential halves of the annular space 31. In addition, the respective baffle elements of each pair are oppositely inclined so that the respective planes of the baffle elements intersect in symmetrical fashion with respect to the longitudinal axis of the concentric pipes. It will further be observed from FIG. 5 that successive pairs of opposed baffles 29 are displaced or rotated circumferentially about 90° to provide different circumferential orientations of successive pairs of baffles. Thus, each baffle member 29 effectively blocks a circumferential half of the annular space 31, but in traversing the length of the annular space 31 the circumferential half of the passage blocked by any one baffle 29 is overlapped by portions of the baffle elements of the next adjacent pair.

The baffle arrangement shown in FIG. 5 has essentially the same effect as the baffle arrangement shown in FIGS. 1–4 and produces a highly effective shear action by repeated impingement and diversion or reversal of flow. However, the type of baffling shown in FIG. 5 has the additional advantage of also providing a swirl action which is particularly desirable when a relatively small amount of gas is being diffused and mixed into a flowing liquid. Thus, the possibility of a small gas stream flowing up the wall of the outermost tube, leaking through the slight clearance between the tube wall and the baffles, and partially by-passing the liquid is avoided by the FIG. 5 baffle arrangement which causes the vertically rising gas bubbles to move in a rotary or helical path, thereby supplementing the back-and-forth flow reversal action of the baffles.

In the operation of the FIG. 5 embodiment, the low viscosity fluid is jetted through the holes 33 in the tube 28 to provide a preliminary distribution thereof in the high viscosity liquid entering the end 27 of the tube 26. However, as in the previous embodiment, the major mixing and absorption are accomplished during passage of the fluids through the baffled annular space 31. Here again the repeated impingement and diversion contacts with the baffles 29 create an effective shear action which provides breakup and development of new surfaces in the highly viscous liquid and thereby facilitating absorption of the gas or mixing with the low viscosity fluid. The swirl action described above avoids undesirable by-passing of gas, especially where gas volume is relatively small. This embodiment of the invention is also highly advantageous for use in heating a viscous liquid by direct injection of steam so as to avoid local overheating and waste of steam as typically encountered in large heating vessels.

In FIGS. 6–8 a modification of the invention is shown which is generally similar to the embodiment of FIGS. 1–4 except for somewhat different relative diameters of the inner and outer tubes and a different outlet arrangement for the inner tube. Thus, the mixer has an outer tube 36, a concentric inner tube 37, and a plurality of angular semi-elliptical baffles 38 spanning the annular space 38 between the concentric tubes. However, the lower end of the inner tube 37, instead of being open as in the first described embodiment of the invention, is provided with a closure plate 31 having a pair of diametrically extending slots 42 which intersect at the center of the plate 41 to provide an end aperture 43 in the shape of a cross. This embodiment of the invention is particularly useful where a relatively small amount of a lower viscosity liquid is being mixed with a larger amount of a higher viscosity liquid. Thus, in operation, a limited amount of low viscosity fluid is discharged downwardly through the inner tube 37 and is initially injected at high velocity through the restricted outlet 43 for initial dispersion in the larger quantity of high viscosity fluid which is introduced through an inlet 44 at the bottom of the outer tube 36.

A further variation of the mixer apparatus is shown in FIGS. 9 and 10 wherein the device comprises an outer tube 46, an inner tube 47, and a plurality of inclined semi-elliptical baffles 48 blocking the annular flow passage 49 between the tubes. In this case, the lower end of the pipe 47 is closed by a plate 51, and an outlet is provided for the fluid introduced through the inner tube 47 by means of a plurality of apertures 52 provided in the wall of the tube 47, the apertures 52 being located between the last few baffles 48 at the lower end of the tube 47. This arrangement is particularly useful in mixing gases or vapors (e.g. steam) with liquids in which case the gas or vapor is passed downwardly through the inner tube 47 and the liquid passes upwardly through the outer tube 46.

When the mixing operation requires addition of or removal of heat, the outer tube of the mixing apparatus may be fitted with a concentric jacket or coil through which a suitable cooling or heating medium can be circulated. In some cases the fluid mixture produced may require further treatment, such as pH adjustment or the like. In the apparatus of the present invention, this additional treatment is readily accomplished by injection of a suitable treating agent, such as a small stream of acid or alkali, into the discharge outlet 13 shown in FIG. 1. The highly turbulent flow of the mixture leaving the outlet 13 is sufficient to accomplish intimate mixing of the minor amount of treating agent. It will be appreciated that the mixer of the present invention may be constructed from a variety of metals or non-metallic materials of construction, such as glass, ceramics, plastics, or the like.

To illustrate the operation and efficiency of the novel mixer of the present invention, the following specific examples are given:

*Example I*

In a mixer of the type shown in FIGS. 1–4 having a length of approximately 10 ft. and an outer diameter of about 6 inches, a flow of 20 gallons per minute of blackstrap molasses having a viscosity of about 100,000 cp. is admitted through the inner pipe 16. A flow of approximately 20 gallons per minute of water having a viscosity of 1 cp. is admitted through the inlet nozzle 12. Using preheated water, the resulting effluent from the discharge outlet 13 has a temperature of 180° F. and a density of 45° Brix, with momentary variations not exceeding 1° Brix. The net pressure drop through the mixer (excluding static head) is about 2.6 lbs. per sq. in., and the calculated energy consumption is 2,000 ft.-lbs. per minute which is equivalent to about .06 horsepower.

*Example II*

In a mixer of the type illustrated in FIG. 5, a maximum flow of about 24 gallons per minute of concentrated kraft mill black liquor enters the inlet end 27 of the outer tube 26 and is contacted with a maximum flow of about 12 standard cubic feet per minute of oxygen introduced through the inner pipe 28. With a mixer approximately 10 ft. in length and about 1½ inches in outside diameter, absorption of the oxygen is essentially complete at the discharge outlet from the mixer, and the observed pressure drop is about 5 lbs. per sq. in.

*Example III*

In a mixer of the type shown in FIGS. 6–8, a flow of about 40 gallons per minute of 40° Brix molasses is introduced through the inlet 44 at about 100° F. and is mixed with a flow of about .3 gallon per minute of lime slurry introduced through the pipe 37. The mixed dimensions are 10 ft. in length with a 4 in. outside diameter. Neutralization of the molasses solution by the lime slurry is accomplished within the mixer and the effluent from the mixer shows a substantially uniform pH, with a variation of not more than about .2 pH. The pressure drop through the mixer is less than about 5 lbs. per sq. in.

*Example IV*

In a mixer of the type shown in FIGS. 9–10 having a length of 10 ft. and a 3 in. outside diameter, a flow of about 40 gallons per minute of diluted molasses is introduced to the lower end of the pipe 46 and is contacted with 900 lbs. per hr. of steam passing downwardly through the inner pipe 47. The heating is accomplished with substantially no audible noise and with an observed pressure drop of less than about 5 lbs. per sq. in. The temperature of the molasses solution at the outlet from the mixer is about 180° F. with momentary variations of less than 0.5° F.

Although the invention has been described with particular reference to certain specific structural embodiments thereof, it is to be understood that various alternatives and equivalent structures may be resorted to without departing from the scope of the invention as defined in the appended claims.

I claim:

1. In a fluid mixer having elongated concentric inner and outer tubular members defining an elongated annular mixing space therebetween with means at one end of said outer tubular member for introducing a first fluid into said mixing space, discharge means at the opposite end of said outer tubular member for withdrawing a fluid mixture from said mixing space, and means for introducing a second fluid from said inner tubular member into said mixing space adjacent said one end of said outer tubular member whereby said fluids are adapted to flow together through said mixing space towards said discharge means;

the improvement which comprises a plurality of inclined semi-elliptical baffles extending between said tubular members within said mixing space, said baffles being spaced along the length of said mixing space at alternating generally opposed angles of inclination with respect to the longitudinal axis of said tubular members and being oriented alternately so as to block different circumferential halves of said mixing space whereby to provide a tortuous flow path for said fluids involving repeated impingement on and diversion by said baffles.

2. A fluid mixer comprising an elongated outer tubular member having means for introducing a first fluid at one end thereof and discharge means for withdrawing a fluid mixture adjacent the opposite end thereof, an elongated inner tubular member disposed concentrically within said outer tubular member for introducing a second fluid and defining an elongated annular mixing space therebetween, said inner tubular member having fluid outlet means within said outer tubular member adjacent said one end of the latter whereby said fluids are adapted to flow together through said mixing space toward said discharge means, and a plurality of inclined semi-elliptical baffles extending between said tubular members in said mixing space, said baffles being disposed along the length of said mixing space at alternating generally opposed angles of inclination with respect to the longitudinal axis of said tubular members so that the flowing fluids are diverted by each baffle and impinged against the next succeeding baffle, and said baffles being oriented at varying locations circumferentially of said mixing space so as to effect repeated impingement and diversion of said fluids without by-passing any of said baffles during flow through said mixing space.

3. The structure of claim 2 further characterized in that each of said baffles is disposed in a plane having an angle of inclination of from about 30° to about 60° with respect to the longitudinal axis of said tubular members.

4. The structure of claim 3 further characterized in that said angle of inclination is about 45°.

5. The structure of claim 2 further characterized in that said inner tubular member extends into said opposite end of said outer tubular member and said baffles are rigidly secured at their innermost edges to said inner tubular member so that said inner tubular member and said baffles are removable as a unit from said outer tubular member, said baffles having a close fit at their outermost edges with said outer tubular member when the mixer is assembled so as to substantially prevent fluid flow therebetween.

6. The structure of claim 2 further characterized in that said fluid outlet means comprises an unobstructed open end portion on said inner tubular member.

7. The structure of claim 2 further characterized in that said fluid outlet means comprises a slotted axial end portion on said inner tubular member.

8. The structure of claim 2 further characterized in that said fluid outlet means comprises a plurality of radial apertures spaced circumferentially around said inner tubular member.

9. A fluid mixer comprising an elongated outer tubular member having means for introducing a first fluid at one end thereof and discharge means for withdrawing a fluid mixture adjacent the opposite end thereof, an elongated inner tubular member extending concentrically into said opposite end of said outer tubular member for introducing a second fluid and defining an elongated annular mixing space therebetween, said inner tubular member having fluid outlet means within said outer tubular member adjacent said one end of the latter whereby said fluids are adapted to flow together through said mixing space toward said discharge means, and a plurality of inclined semi-elliptical baffles extending between said tubular members in said mixing space, said baffles being spaced along the length of said mixing space with alternate baffles having a generally opposite inclination with respect to the longitudinal axis of said tubular members so that the flowing fluids are diverted by each baffle and impinged against the next succeeding baffle, and said baffles being disposed in generally opposed relation circumferentially of said mixing space whereby to provide for repeated impingement and diversion of said fluids without by-passing any of said baffles during flow through said mixing space.

10. A fluid mixer comprising an elongated outer tubular member having means for introducing a first fluid at one end thereof and discharge means for withdrawing a fluid mixture adjacent the opposite end thereof, an elongated inner tubular member extending concentrically into said opposite end of said outer tubular member for introducing a second fluid and defining an elongated annular mixing space therebetween, said inner tubular member having fluid outlet means within said outer tubular member adjacent said one end of the latter whereby said fluids are adapted to flow together through said mixing space toward said discharge means, and a plurality of inclined semi-elliptical baffles extending between said tubular members in said mixing space, said baffles being arranged in spaced pairs along the length of said mixing space with the baffles of each pair having a generally opposite inclination with respect to the longitudinal axis of said tubular members and being disposed opposite each other circumferentially of said mixing space, and alternate pairs of said baffles being oriented so as to block different circumferential halves of said mixing space, whereby to provide for repeated impingement and diversion of said fluids and swirling thereof during flow through said mixing space.

References Cited by the Examiner

UNITED STATES PATENTS 2,784,948  3/57  Pahl et al. _____ 259—4

FOREIGN PATENTS 576,211  5/33  Germany.

CHARLES A. WILLMUTH, *Primary Examiner.*